(12) United States Patent
Takase et al.

(10) Patent No.: US 6,545,964 B1
(45) Date of Patent: Apr. 8, 2003

(54) OPTICAL REPRODUCING APPARATUS AND METHOD, OPTICAL RECORDING APPARATUS AND METHOD, AND OPTICAL RECORDING MEDIUM

(75) Inventors: Tsunemitsu Takase, Tokyo (JP); Takashi Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 195 days.

(21) Appl. No.: 09/595,504

(22) Filed: Jun. 16, 2000

(30) Foreign Application Priority Data

Jun. 18, 1999 (JP) .......................................... 11-171903

(51) Int. Cl.⁷ ................................................ G11B 7/00
(52) U.S. Cl. ................ 369/47.51; 369/47.5; 369/13.26; 369/59.11; 369/116; 369/53.26
(58) Field of Search ............................... 369/116, 47.43, 369/53.29, 47.41, 53.27, 53.3, 44.27, 13.02, 275.2, 100, 47.37, 59.11, 13.26, 47.53, 47.5, 47.51

(56) References Cited

U.S. PATENT DOCUMENTS

| | | | | |
|---|---|---|---|---|
| 5,276,670 A | * | 1/1994 | Nogami et al. | 369/100 |
| 5,390,162 A | * | 2/1995 | Fukumoto et al. | 369/116 |
| 5,600,612 A | * | 2/1997 | Saito et al. | 369/100 |
| 5,914,921 A | * | 6/1999 | Yanagi | 369/116 |
| 6,061,314 A | * | 5/2000 | Arai | 369/47.41 |
| 6,424,608 B1 | * | 7/2002 | Takeuchi | 369/47.53 |

* cited by examiner

Primary Examiner—Aristotelis M. Psitos
Assistant Examiner—Kim-Kwok Chu
(74) Attorney, Agent, or Firm—Frommer Lawrence & Haug LLP; William S. Frommer; Darren M. Simon

(57) ABSTRACT

The optical beam of the read power corresponding to the rotating velocity is radiated to a recording medium. Thereby, the rotating velocity of optical disc can be detected and the optical beam of read power corresponding to the detected rotating velocity can be radiated to an optical disc.

9 Claims, 8 Drawing Sheets

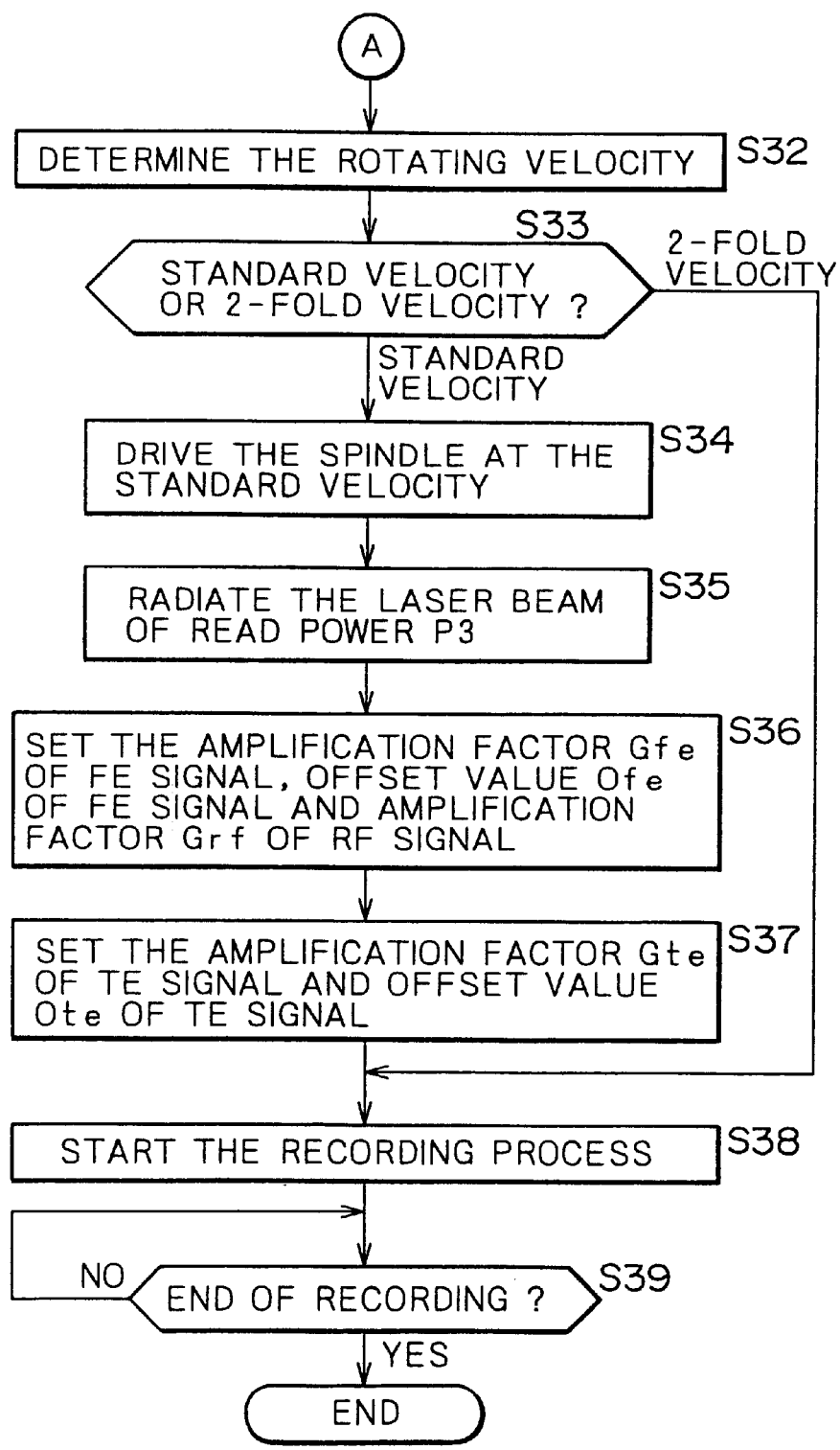

OPTICAL REPRODUCING APPARATUS AND METHOD, OPTICAL RECORDING APPARATUS AND METHOD, AND OPTICAL RECORDING MEDIUM

BACKGROUND OF THE INVENTION

1. Field of the Invention

The present invention relates to an optical reproducing apparatus and method, optical recording apparatus and method, and optical recording medium and particularly to an optical reproducing apparatus and method, optical recording apparatus and method which enables accurate recording and reproducing of data.

2. Description of the Related Art

FIG. 1 illustrates an application example of an optical disc drive. The optical disc drive 2 records the data supplied from a personal computer to a loaded optical disc 3 (for example, CD-R (Compact Disc-Recordable), CD-RW (Compact Disc-Rewritable) or CD-ROM (Compact Disc-Read Only Memory) or reproduces the data recorded on an optical disc 3 to output to a personal computer 1.

In the case where data recorded in an optical disc 3 is reproduced, an optical disc drive 2 radiates the laser beam in the laser power (hereinafter referred to as read power) for reproducing to the signal surface of the optical disc 3 rotating at the predetermined velocity and the light beam (reflected beam) which has been modulated depending on existence of signal (pit) from the signal surface is then converted to an electronic signal. In recent years, the optical disc 3 is caused to rotate at the higher rotating velocity. At present, the disc is rotated practically at the velocity which ranges from the standard velocity (210 rpm at the external circumference of optical disc) to the 24-fold velocity (5040 rpm at the external circumference of optical disc).

However, it is known that the higher the disc 3 rotates in the velocity, the more the C/N ratio is deteriorated at the time of reproducing operation. FIG. 2 illustrates a C1 error in the radius direction of the optical disc 3 which is driven with CAV (Constant Angular Velocity) system. When the optical disc 3 is driven with the CAV system, the rotating velocity of disk becomes higher in the area becoming nearer to the external circumference. Therefore, as a result, FIG. 2 illustrates relationship between the rotating velocity and C1 error.

In FIG. 2, the line A indicates the relationship between the rotating velocity and C1 error in the data reproducing operation when the laser beam of the lowest read power is radiated, while the line B when the laser beam of the read power B higher than the read power A is radiated and the line C when the laser beam of the read power C higher than the read power B is radiated. In any case, when the rotating velocity becomes higher, the C1 error becomes larger.

However, in the case of read power B (line B), the C1 error during high speed rotation is smaller than that in the read power A (line A) and in the case of read power C (line C), the C1 error during high speed rotation is smaller than that in the read power B (line B). Namely, when the read power is higher, the C1 error becomes smaller during the high speed rotation. Therefore, it is considered that the deterioration of C/N ration during high speed rotation can be prevented by using higher read power, but when the laser power having excessively higher read power is used, a problem is in turn generated during the recording operation.

For example, on the occasion of recording the data to an optical disc 3 in the optical disc drive 2, the laser beam in the intensity in which the laser power for recording (hereinafter write power) is further added to the read power radiates, as illustrated in FIG. 3, the signal surface of the optical disc 3 rotating at the predetermined rotating velocity. Thereby, pits are formed on the signal surface of optical disc 3 to record the data. However, if the read power is too high, total intensity of laser beam radiating the optical disc 3 becomes too high and the pits are thereby deformed. As a result, the data is no longer recorded accurately. Particularly, when the optical disc 3 is rotating at a lower velocity (for example, at the standard rotating velocity), deformation of pits is generated easily.

Therefore, intensity of read power is naturally limited and after all, it is a problem that data is reproduced by rotating the optical disc 3 at a higher rotating velocity at the time of recording operation without generation of any discrepancy.

SUMMARY OF THE INVENTION

The present invention has been proposed considering the situation explained above and it enables high speed rotation of the optical disc without generation of discrepancy during the recording operation.

According to one aspect of the present invention, an optical reproducing apparatus is characterized in comprising a detecting means for detecting the rotating velocity of a recording medium, a determining means for determining the optical read power corresponding to the rotating velocity detected by the detecting means and a radiating means for radiating the optical beam in the optical read power determined with the determining means to a recording medium.

According to another aspect of the present invention, an optical reproducing apparatus is characterized in comprising a determining means for determining, as a detecting means for detecting the rotating velocity of a recording medium, the rotating velocity based on the TOC information read from the recording medium and also determining the optimum read power corresponding to the rotating velocity detected with the detecting means and a radiating means for radiating the optical beam having the optimum read power determined with the determining means to the recording medium.

According to another aspect of the present invention, the optical reproducing apparatus further comprises a storage means for calculating and storing the amplification factor of a tracking error signal and offset value of the tracking error signal based on the amplitude of the tracking error signal when the focus control is performed and the tracking control is not performed under the condition that the optical beam of the optimum read power is radiated and a setting means for calculating, when the optical beam of the optimum read power is radiated to the recording medium, the amplification factor and offset value of the focus error signal in inverse proportion to amount of change of the read power and also setting such amplification factor and offset value to the radiating means with the amplification factor and offset value of the tracking error signal stored in the storage means, wherein the radiating means radiates, to the recording medium, the optical beam in the optimum read power determined with the determining means based on the amplification factor and offset value of the focus error signal and the amplification factor and offset value of the tracking error signal set by the setting means.

According to another aspect of the present invention, the optical reproducing method is characterized in comprising a detecting step for detecting rotating velocity of a recording medium, a determining step for determining the optimum read power corresponding to the rotating velocity detected in the detecting step and a radiating step for radiating the optical beam of the optimum read power determined with the determining step to the recording medium.

According to another aspect of the present invention, the optical reproducing method is characterized in comprising a determining step for determining, as the detecting step for detecting the rotating velocity of the recording medium, the rotating velocity based on the TOC information read from the recording medium and also determining the optical read power corresponding to the rotating velocity detected in the detecting step and a radiating step for radiating, to the recording medium, the optical beam of the optimum read power determined in the determining step.

According to another aspect of the present invention, the recording medium is characterized in comprising a detecting step for detecting the rotating velocity of the recording medium, a determining step for determining the optimum read power corresponding to the rotating velocity detected in the detecting step and a radiating step for radiating, to the recording medium, the optical beam of the optimum read power determined in the determining step.

According to another aspect of the present invention, the recording medium is characterized is comprising a determining step for determining, as the detecting step for detecting the rotating velocity of the recording medium, the rotating velocity based on the TOC information read from the recording medium and also determining the optimum read power corresponding to the rotating velocity detected in the detecting step and a radiating step for radiating the optical beam of the optimum read power determined in the determining step to the recording medium.

In the optical reproducing apparatus, optical reproducing method and recording medium of the present invention, the rotating velocity of a recording medium is detected, the optimum read power corresponding to detected rotating velocity is determined and the optical beam of the determined optical read power is radiated to the recording medium.

According to another aspect of the present invention, the optical recording apparatus is characterized in comprising a detecting means for detecting the rotating velocity of a recording medium, a determining means for determining the optimum read power corresponding to the rotating velocity detected with the detecting means and a radiating means for radiating, to the recording medium, the optical beam of the power in which the write power is added to the optimum read power determined in the determining means.

According to another aspect of the present invention, the optical recording apparatus is characterized in comprising a determining means for determining, as the detecting means for detecting the rotating velocity of the recording medium, the rotating velocity based on the TOC information read from the recording medium and also determining the optimum read power corresponding to the rotating velocity detected in the detecting means and a radiating means for radiating, to the recording medium, the optical beam of the power in which the write power is added to the optimum read power determined in the determining means.

According to another aspect of the present invention, the optical recording apparatus further comprises a storage means for calculating and storing the amplification factor of a tracking error signal and offset value of the tracking error signal based on the amplitude of the tracking error signal when the focus control is performed and the tracking control is not performed under the condition that the optical beam of the optimum read power is radiated and a setting means for calculating, when the optical beam of the optimum read power is radiated, the amplification factor and offset value of the focus error signal in inverse proportion to amount of change of the read power and also setting such amplification factor and offset value stored to the radiating means with the amplification factor and offset value of the tracking error signal stored in the storage means, wherein the radiating means radiates, to the recording medium, the optical beam of the optimum read power determined with the determining means based on the amplification factor and offset value of the focus error signal and the amplification factor and offset value of the tracking error signal set by the setting means.

According to another aspect of the present invention, the optimum read power in the optical recording apparatus is about 25% or less of the write power.

According to another aspect of the present invention, the optical recording method is characterized in including the detecting step for detecting the rotating velocity of a recording medium, a determining step for determining the optimum read power corresponding to the rotating velocity detected in the detecting step and the radiating step for radiating, to the recording medium, the optical beam in which the write power is added to the optimum read power determined in the determining step.

According to another aspect of the present invention, the optical recording method is characterized in including the determining step for determining the rotating velocity based on the TOC information read from the recording medium as the detecting step for detecting the rotating velocity of the recording medium and also determining the optimum read power corresponding to the rotating velocity detected in the detecting step and the radiating step for radiating, to the recording medium, the optical beam in which the write power is added to the optimum read power determined in the determining step.

According to another aspect of the present invention, the recording medium is characterized in consisting of the detecting step for detecting the rotating velocity of the recording medium, determining step for determining the optimum read power corresponding to the rotating velocity detected in the detecting step and the radiating step for radiating, to the recording medium, the optical beam in which the write power is added to the optimum read power determined in the determining step.

According to another aspect of the present invention, the recording medium is characterized in consisting of the determining step for determining the rotating velocity based on the TOC information read from the recording medium as the detecting step for detecting the rotating velocity of the recording medium and also determining the optimum read power corresponding to the rotating velocity detected in the detecting step and the radiating step for radiating, to the recording medium, the optical power in which the write power is added to the optimum read power determined in the determining step.

According to another aspect of the present invention, in the optical recording apparatus, optical recording method and recording medium, the rotating velocity of recording medium is detected, the optimum read power corresponding to the detected rotating velocity is determined and the optical beam of the power in which the write power is added to the determined optimum read power is radiated to the recording medium.

BRIEF DESCRIPTION OF THE DRAWINGS

FIG. 7 is the continued flowchart for explaining the read power adjusting process during the recording operation.

DETAILED DESCRIPTION OF THE PREFERRED EMBODIMENT

Figure 1:
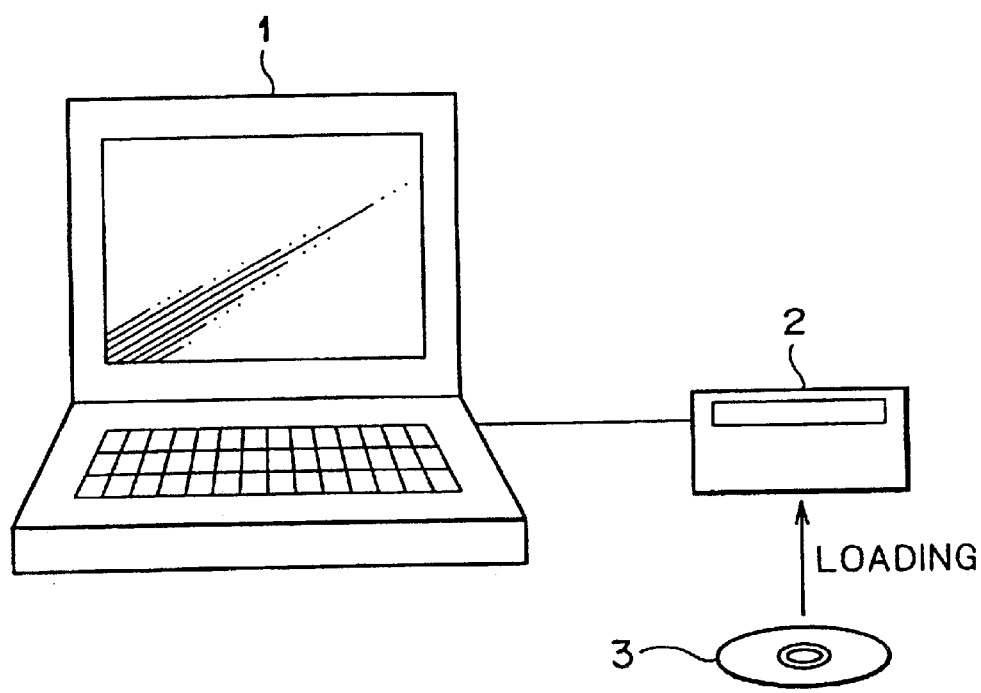
FIG. 1 is a diagram illustrating application example of an optical disc drive.
Figure 2:
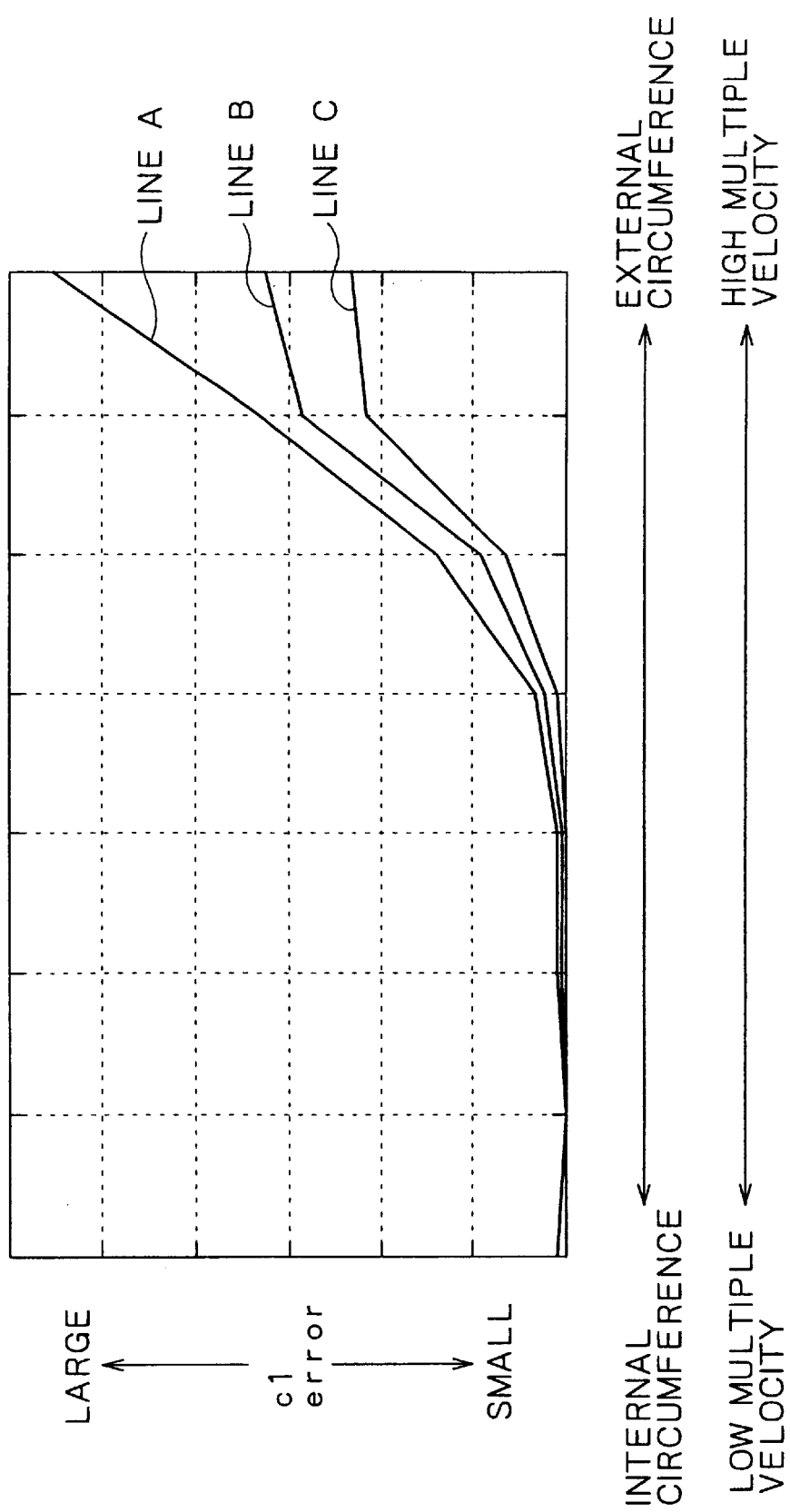
FIG. 2 is a diagram illustrating relationship between rotating velocity and C1 error.
Figure 3:
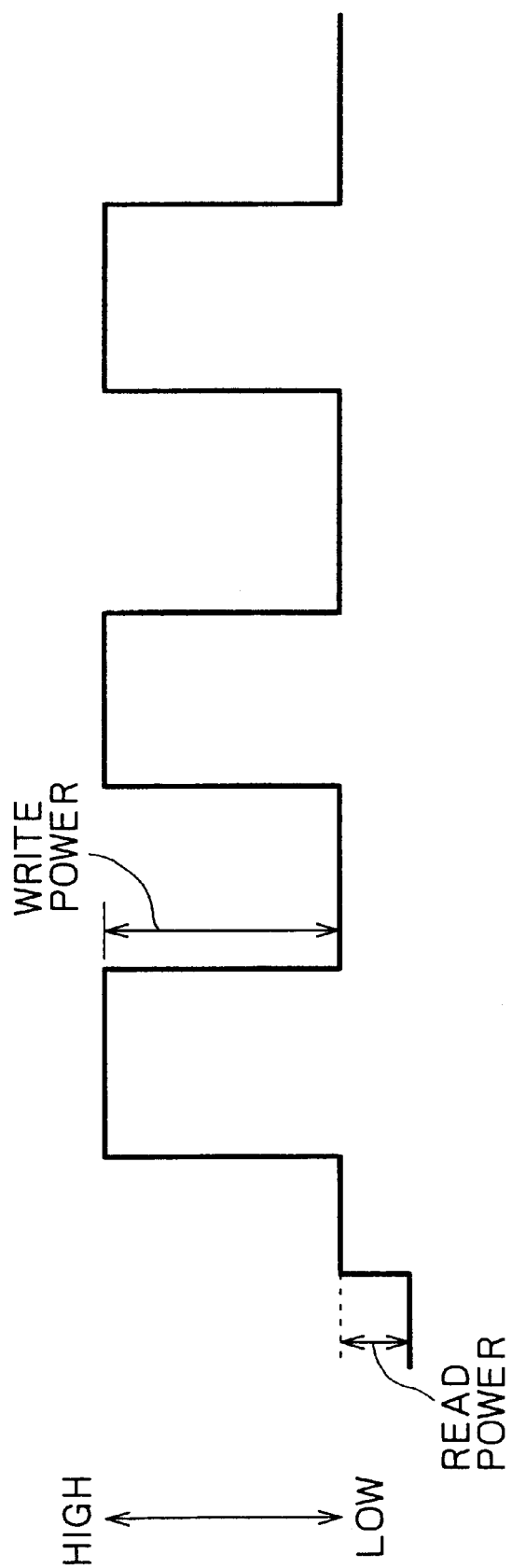
FIG. 3 is a diagram for explaining the write power.
Figure 4:
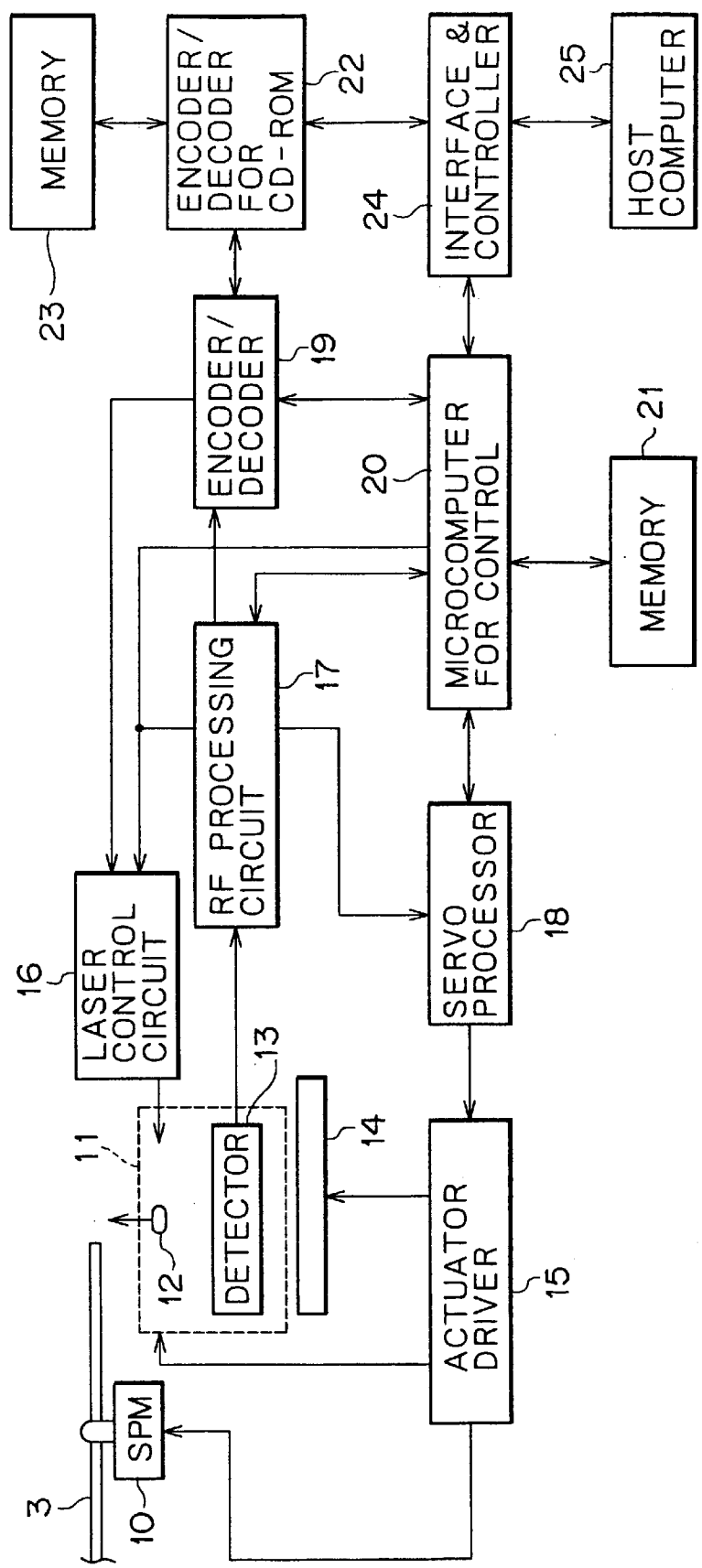
FIG. 4 is a block diagram illustrating an example of structure of the optical disc drive to which the present invention is applied.

FIG. 4 illustrates an example of structure of the optical disc drive to which the present invention is applied. An optical pickup 11 is composed of a laser diode 12 and a detector 13 and the laser diode 12 radiates the signal surface of an optical disc 3 with the laser (optical beam). The detector 13 receives the optical beam modulated depending on existence of pit which is reflected from the signal surface of optical disc 3, converts the reflected light beam into an electrical signal and outputs this electrical signal to an RF (Radio Frequency) processing circuit 17.

A sled motor 14 drives the optical pickup 11 in the radius direction of optical disc 3. An actuator driver 15 drives a spindle motor 10, optical pickup 11 and sled motor 14.

A laser control circuit 16 controls the optical beam radiated to the optical disc 3 from the optical pickup 11 depending on the instruction from a microcomputer 20 for control.

The RF processing circuit 17 is controlled with the microcomputer 20 for control to execute the predetermined process. For example, the RF processing circuit 17 executes the addition and subtraction of the signals detected with the detector 13 to generate a tracking error signal (hereinafter referred to as TE (Tracking Error) signal) and a focus error signal (hereinafter referred to as FE (Focus Error) signal) and then outputs these signals to a servo-processor 18. The RF processing circuit 17 also generates a reproducing signal from the signal detected with the detector 13 and outputs this reproducing signal to an encoder/decoder 19.

The servo-processor 18 executes the tracking control and focus control for the actuator driver 15 based on the TE signal and FE signal input from the RF processing circuit 17.

The encoder/decoder 19 is controlled from the microcomputer 20 for control to EFM-demodulate the reproducing signal generated in the RF processing circuit, execute the error correction, thereafter convert the signal to the format for CD-ROM, moreover EFM-modulate the signal input from the encoder/decoder 22 for CD-ROM, add the error correction code and thereafter output the signal to the laser control circuit 16. Moreover, the encoder/decoder 19 outputs the information about error correction or the like to the microcomputer 20 for control.

The microcomputer 20 for control controls the laser control circuit 16, RF processing circuit 17, servo-processor 18 and encoder/decoder 19. A memory 21 stores appropriately the data required by the microcomputer 20 for control for execution of various processes.

The encoder/decoder 22 for CD-ROM stores the signal of CD-ROM format demodulated in the encoder/decoder 19 to the memory 23 and also generates the reproducing data through demodulation. The encoder/decoder 22 for CD-ROM also causes the memory 23 to store the recording data input via the interface & controller 24 from the host computer 25 and then encodes the data to the signal of the format for CD-ROM and then outputs the data to the encoder/decoder 19.

The interface & controller 24 controls the microcomputer 20 for control and encoder/decoder 22 for CD-ROM based on the instruction from the host computer 25.

The host computer 25 outputs the signal corresponding to the instruction from a user to the microcomputer 20 for control and encoder/decoder 22 for CD-ROM via the interface & controller 24.

Figure 5:
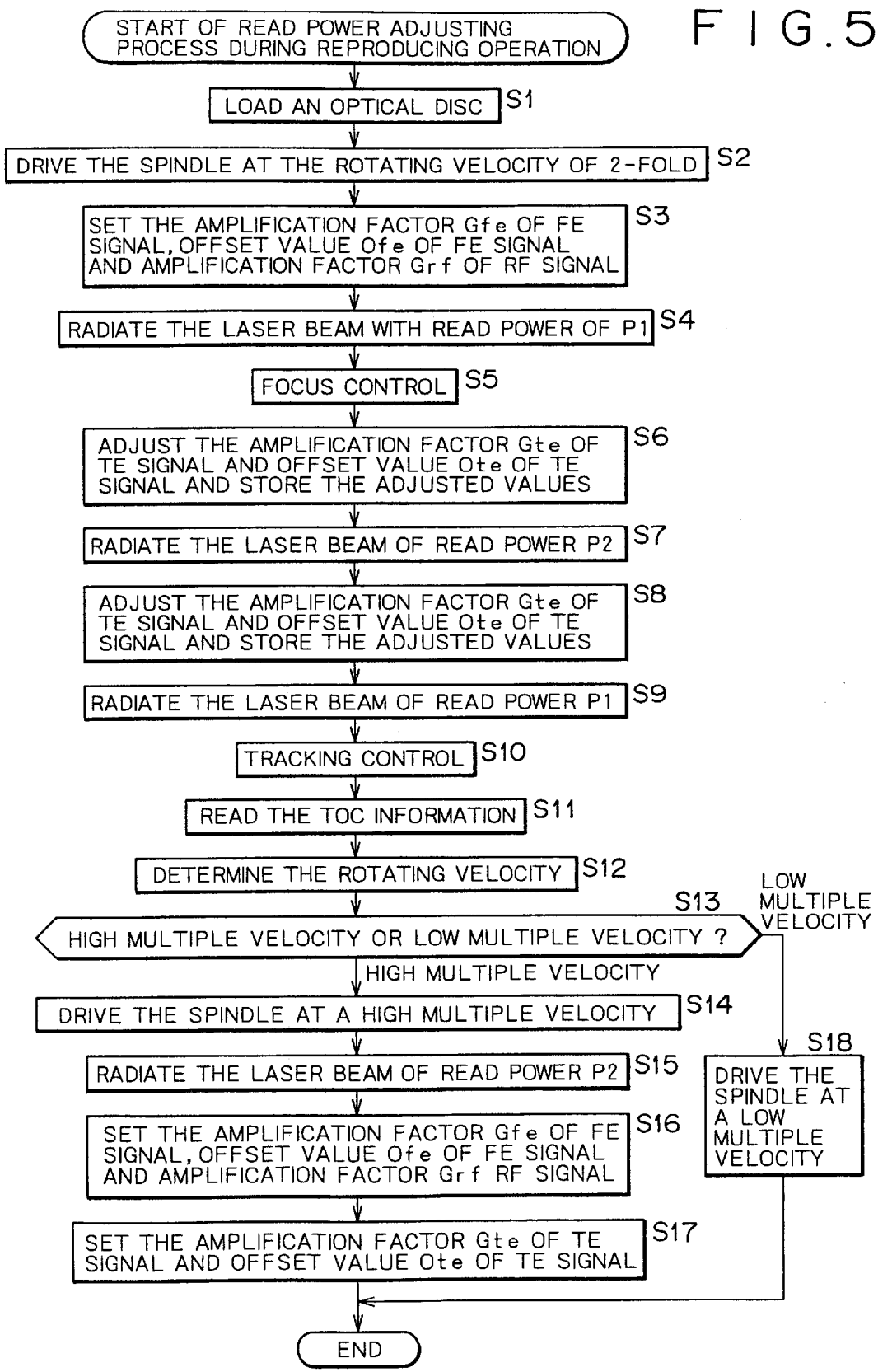
FIG. 5 is a flowchart for explaining the read power adjusting process during the reproducing operation.

Next, the read power adjusting process during the reproducing operation of the optical disc drive of FIG. 4 will be explained with reference to the flowchart of FIG. 5. In the case of this example, the optical disc 3 is assumed to be rotated in the standard velocity, 2-fold velocity, 4-fold velocity, 12-fold velocity and 24-fold velocity.

When the optical disc 3 is loaded to the spindle 10-A in the step S1, the actuator driver 15 drives, in the step S2, the spindle 10-A at the predetermined velocity (for example, 2-fold velocity in this example).

The microcomputer 20 for control reads, from the memory 21, the amplification factor Grf-1 of RF signal, amplification factor Gfe-1 of EF signal and offset value Ofe-1 of EF signal and sets these signals to the RF processing circuit 17. The RF processing circuit 17 generates the RF signal and FE signal on the basis of the preset amplification factor Gfe-1 and amplification factor Grf-1.

The amplification factor Grf of RF signal, amplification factor Gfe of EF signal and offset value Ofe of FE signal change depending on amplitude of read power. The amplification factor Grf-1, amplification factor Gfe-1 and offset value Ofe-1 are the amplification factor Grf of RF signal, amplification factor Gfe of FE signal and offset value Ofe of FE signal when the read power of the laser beam emitted in the step S4 explained later is P1 and these values are measured when the optical disc drive is manufactured and are stored in the memory 21.

The microprocessor 20 for control controls the laser control circuit 16 in the step S4, causing the optical pickup 11 to emit the laser beam of the read power P1 toward the signal surface of optical disc 3.

The microcomputer 20 for control controls, in the step S5, the servo-processor 18 to focus-control the actuator driver 15. Namely, the servo-processor 18 focus-controls the actuator driver 15 based on the FE signal amplified in the amplification factor Gfe-1 supplied from the RF processing circuit 17. In this case, the actuator driver 15 is only focus-controlled but is never tracking-controlled.

Next, in the step S6, the microcomputer 20 for control controls the RF processing circuit 17 to measure the amplitude of TE signal when only the focus-control is performed and then adjusts the amplification factor Gte and offset value Ote of the TE signal so that the measured amplitude becomes identical to the predetermined value. Here, the microcomputer 20 for control fetches the amplification factor Gte and offset value Ote of the TE signal adjusted in the RF processing circuit 17 (hereinafter, the amplification factor Gte and offset value Ote are described as the amplification factor Gte-1 and offset value Ote-1) from the RF processing circuit 17 and then stores these values to the memory 21.

The microcomputer 20 for control controls, in the step S8, the RF processing circuit 17 to measure the amplitude of TE signal when only the focus-control is conducted and to adjust the amplification factor Gte and offset value Ote of TE signal so that the measured amplitude becomes identical to the predetermined value. Here, the microcomputer 20 for control fetches the amplification factor Gte and offset value Ote of the TE signal adjusted in the RF processing circuit 17 (hereinafter, the amplification factor Gte and offset value Ote are described as the amplification factor Gte-2 and offset value Ote-2) from the RF processing circuit 17 and stores these values in the memory 21. Thereby, the amplification factor Gte-1, offset value Ote-1 and amplification factor Gte-2 and offset value Ote-2 are stored in the memory 21.

Next, in the step S9, the microprocessor 20 for control controls the laser control circuit 16 to radiate the laser beam of read power P1 to the optical disc 3 from the optical pickup 11. The microprocessor 20 for control also sets the amplification factor Gte-1 and offset value Ote-1 to the RF processing circuit. In the step S10, the microprocessor 20 controls the servo-processor 18 for the tracking control of the actuator driver 15. Thereby, the data reproducing with the read power P1 may be started.

In the step S11, the microprocessor 20 for control outputs the TOC information from the TOC domain.

The microprocessor 20 for control determines, in the step S12, the rotating velocity of optical disc 3. The rotating velocity of optical disc 3 is different depending on the type of optical disc 3 or on the application content of disc 3. For example, when the optical disc 3 is a CD-ROM, it is rotated at the velocity of 24-fold of the standard velocity. When the rotating velocity is determined depending on the kind of optical disk, the microprocessor 20 for control reads the TOC information from optical disk 3 to detect type of the optical disc 3 and determines the rotating velocity. Moreover, when the optical disc 3 is a CD-ROM or CD-RW, it is rotated at any velocity ranging from the standard velocity to 24-fold velocity depending on the application content. In this case, the microprocessor 20 for control detects the optical disc 3 loaded to the spindle 10-A is the CD-R or CD-RW and thereafter also detects the application content to determined the rotating velocity thereof.

Next, in the step S13, the microprocessor 20 for control determines whether the rotating velocity determined in the step S12 is standard velocity, 2-fold, or 4-fold velocity (hereinafter, if it is not required to individually discriminate the rotating velocity, the velocity is called a low multiple velocity) or 12-fold or 24-fold (hereinafter, if it is not required to individually discriminate the rotating velocity, the velocity is called a high multiple velocity). When the rotating velocity is determined as a high multiple velocity, the process goes to the step S14.

In the step S14, the actuator driver 15 drives the spindle 10-A at the rotating velocity (high multiple velocity) determined in the step S12. The microprocessor 20 for control controls, in the step S15, the laser control circuit 16 to emit the laser beam of read power P2 to the optical disc 3 from the optical pickup 11.

In the step S16, the microprocessor 20 for control multiplies 1/A respectively to the amplification factor Gfe (=amplification factor Gfe-1×A), offset value Ofe of FE signal (=offset value Ofe-1×A) and amplification factor Grf of RF signal (=amplification factor Grf-1×A changed (enlarged) because the intensity of the laser beam is changed to the read power 2 in the step S15 (read power P1 is multiplied with A) and sets the multiplied results (amplification factor Gfe-1, offset value Ofe-1 and amplification factor Grf-1) to the RF processing circuit 17. The RF processing circuit 17 generates the FE signal based on the preset amplification factor Gfe-1 and offset value Ofe-1 and also generates the RF signal based on the amplification factor Grf-1. Thereby, the FE signal and RF signal when the read power is P2 are generated on the basis of the offset value Ofe-1 and amplification factor Grf-1 which are same as those when the read power is P1.

In the step S17, the microprocessor 20 for control reads, from the memory 21, the amplification factor Gte-2 of TE signal and offset value Ote-2 of TE signal (data stored in the step S8) and sets these values to the RF processing circuit 17. The RF processing circuit 17 generates the TE signal based on the preset amplification factor Gte-2 and offset value Ote-2. Thereby, the amplitude of TE signal when the read power is P2 is maintained at the same amplitude when the read power is P1.

When the low multiple velocity is detected in the step S13, the actuator driver 15 drives, in the step S18, the spindle 10-A at the rotating velocity (low multiple velocity) determined in the step S12. Thereafter, the process is completed.

Namely, in this case, when the optical disc 3 is rotated at a low multiple velocity, the optical beam of read power P1 is radiated and thereby the amplification factor Gfe-1 of FE signal, offset value Ofe-1 of FE signal, amplification factor Grf-1 of RF signal, amplification factor Gte-1 of TE signal and offset value Ote-1 of TE signal are set. Moreover, when the disc 3 is rotated at a high multiple velocity, the optical beam of read power P2 (A times the read power P1) is radiated to the disc and the amplification factor Gfe-1 of FE signal, offset value Ofe-1 of FE signal, amplification factor Grf-1 of RF signal, amplification factor Gte-2 of TE signal and offset value Ote-2 of TE signal are set.

As explained above, when the optical disc 3 is rotated at a high multiple velocity, the optical disc 3 is irradiated with a laser beam of higher intensity (read power P2) and therefore the data can be reproduced accurately. Moreover, since the amplification factor Gte and offset value Ote of TE signal corresponding to the laser beam intensity are calculated and stored (step S6 or step S8), when the read power is changed, the amplification factor Gte and offset signal Ote of corresponding TE signal can be set easily.

Figure 6:
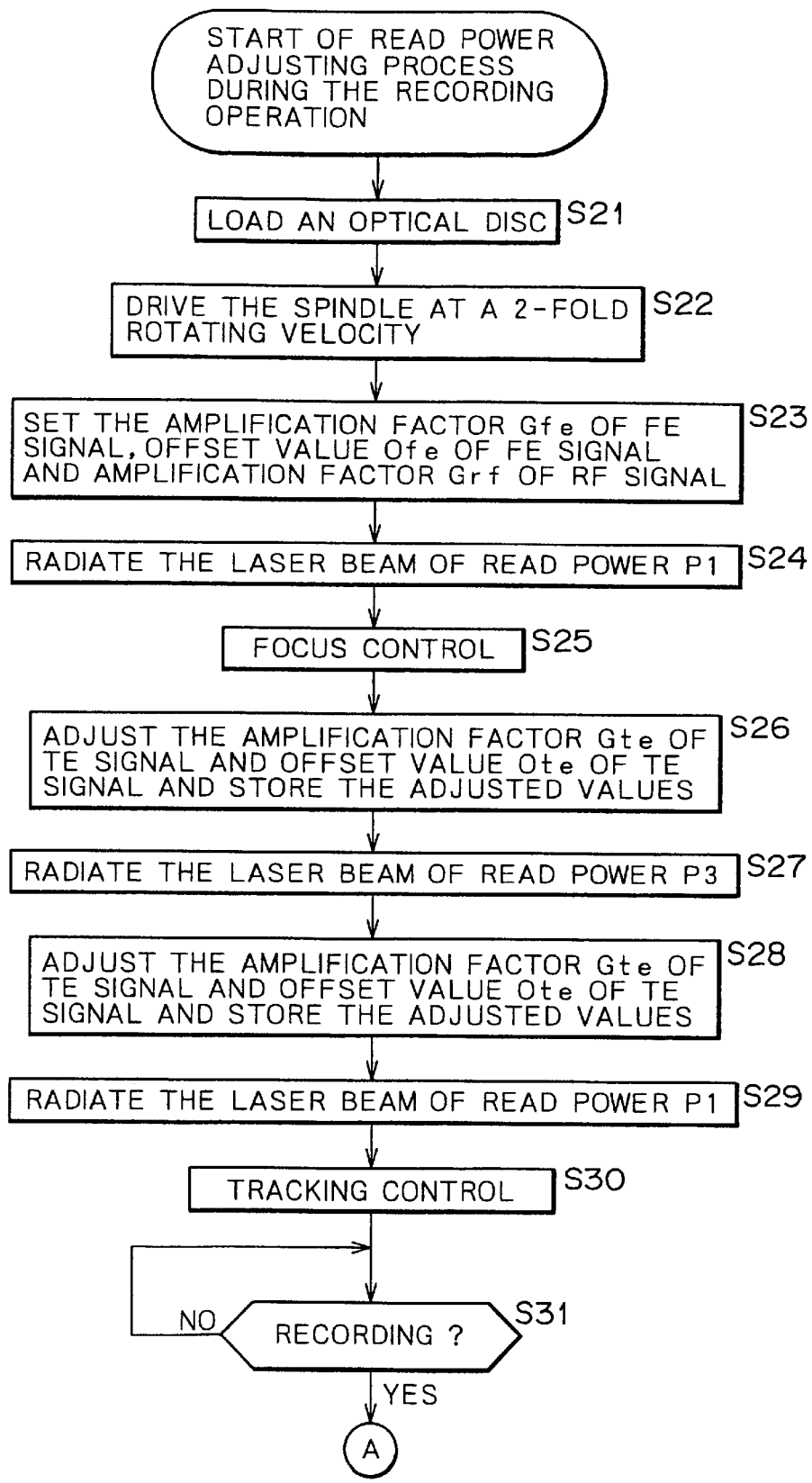
FIG. 6 is a flowchart for explaining the read power adjusting process during the recording operation.

Next, the read power adjusting process during the recording operation will be explained with reference to the flowcharts of FIG. 6 and FIG. 7. In the step S21, when the optical disc 3 recording the data is loaded to the spindle 10-A, the actuator driver 15 drives the spindle 10-A at the predetermined multiple velocity (2-fold velocity in this case) in the step S22.

The microcomputer 20 for control reads, in the step S23, the amplification factor Grf-1 of RF signal, amplification factor Gfe of FE signal and offset value Ofe-1 of FE signal when the read power is P1 from the memory 21 and thereafter sets these values to the RF processing circuit 17. In the step S24, the microprocessor 20 for control controls the laser control circuit 16 to emit the laser beam of read power P1 from the optical pickup 11 to the optical disc 3.

The microcomputer 20 for control controls, in the step S25, the servo-processor 18 for the focus control of the actuator driver 15. Next, in the step S26, the microcomputer 20 for control controls the RF processing circuit 17 to measure the amplitude of TF signal when only the focus control is executed but the tracking control is never executed and also adjust the amplification factor Gte and offset value Ote of TE signal so that the measured amplitude becomes identical to the predetermined value. The microcomputer 20 for control fetches the amplification factor Gte and offset value Ote of TE signal adjusted in the RF processing circuit 17 (in this case, the amplification factor Gte-1 and offset value Ote-1) from the RF processing circuit 17 and thereafter store these values to the memory 21.

Next, in the step S27, the microcomputer 20 controls the laser control circuit 16 to radiate the laser beam of the read power P3 which is B times the read power P1 to the optical disc 3 from the optical pickup 11. Value B is set to 25% or less in terms of the rate of read power to the write power. It is because when the read power has the laser intensity of 25% or more of the write power, pit is formed even when only the read power is radiated.

In the step S28, the microcomputer 20 controls the RF processing circuit 17 to measure the amplitude of the TE signal when only the focus control is executed but the tracking control is never executed and to adjust the amplification factor Gte and offset value Ote of TE signal so that the measured amplitude becomes identical to the predetermined value. The microcomputer 20 for control fetches, from the RF processing circuit 17, the amplification factor Gte and offset value Ote of TE signal adjusted in the RF processing circuit 17 (hereinafter the amplification factor Gte and offset value Ote of this case are described as the amplification factor Gte-3 and offset value Ote-3) and then stores these values in the memory 21. Therefore, the amplification factor Gte-1, offset value Ote-1 and amplification factor Gte-3 and offset value Ote-3 are stored in the memory 21.

Next, in the step S29, the microprocessor 20 controls the laser control circuit 16 to radiate the laser beam of read power P1 to the optical disc 3 from the optical pickup 11. Moreover, the microprocessor 20 sets the amplification factor Gte-1 and offset value Ote-1 to the RF processing circuit 17. In the step S30, the microprocessor 20 controls the servo-processor 18 for the tracking control of the actuator driver 15. Thereby, data reading is now possible and for example, the address in which the data is recorded can then be read.

In the step S31, the microcomputer 20 is in the waiting condition, in the step S31, until the instruction to start the recording is input from the host computer 25 and when such instruction is input, the process goes to the step S32.

In the step S32, the microcomputer 20 determines the rotating velocity of an optical disc 3. In the case of this example, the optical disc 3 is assumed to be rotated at the standard velocity or 2-fold velocity during the recording operation. In the step S33, the microcomputer 20 determines whether the determined rotating velocity is the standard velocity or 2-fold velocity. When the rotating velocity is determined as the standard velocity, the process goes to the step S34.

In the step S34, the actuator driver 15 drives the spindle 10-A at the standard velocity. In the step S35, the microprocessor 20 controls t he laser control circuit 16 to emit the laser beam of read power P3 to the optical disc 3 from the optical pickup 11.

In the step S36, the microprocessor 20 multiplies 1/B to the amplification factor Gfe (=amplification factor Gfe-1×B) of FE signal, offset value Ofe of FE signal (=offset value Ofe-1×B) and amplification factor Grf of RF signal (=Grf-1×B) which are changed (reduced) because the intensity of laser beam is changed to the read power P3 (the read power P1 is multiplied with B) and then sets the multiplied result (amplification factor Gfe-1, offset value Ofe-1 and amplification factor Grf-1) to the RF processing circuit 17. The RF processing circuit 17 generates the FE signal based on the preset amplification factor Gfe-1 and offset value Ofe-1 and also generates the RF signal based on the preset amplification factor Grf. Thereby, the FE signal RF signal when the read power is P3 are generated on the basis of the amplification factor Gfe-1 and amplification factor Grf-1 which are identical to that when the read power is P1.

In the step S37, the microprocessor 20 reads, from the memory 21, the amplification factor Gte-3 of TE signal and offset value Ote-3 of TE signal (stored in the step S28) and then sets these values to the RF processing circuit 17. The RF processing circuit 17 generates the TE signal based on the preset amplification factor Gre-3 and offset value Ote-3. Therefore, the amplitude of the TE signal when the read power is P3 is maintained at the value equal to that when the read power is P1.

When the amplification factor Gte-3 and offset value Ote-3 are set in the step S37, or when the rotating velocity is determined as 2-fold velocity in the step S33, the process goes to the step S38, wherein the recording process is started. In the step S39, the microcomputer 20 for control is in the waiting condition until the instruction to stop the recording process is issued from the host computer 25 (during this period, the recording process is continuously executed). When such instruction is input, the process is completed.

Namely, in the case of this example, the read power P1 is radiated when the recording is executed through rotation of the optical disc 3 in the 2-fold velocity and thereby amplification factor Gfe-1 of FE signal, offset value Ofe-1 of FE signal, amplification factor Grf-1 of RF signal, amplification factor Gre-1 of TE signal and offset value Ote-1 of TE signal are set. Moreover, when the recording is conducted in the standard velocity, the read power P3 (B times the read power P1) is radiated and thereby the amplification factor Gfe-1 of FE signal, amplification factor Grf-1 of RF signal, amplification factor Gte-3 of TE signal and offset value Ote-3 of TE signal are set.

As explained above, when the optical disc 3 is rotated at the standard velocity (a low multiple velocity), the laser beam of low intensity (read power P3) is radiated to the optical disc 3. Accordingly, deformation of pit due to the laser beam of read power is never generated. Namely, data can be recorded accurately. Moreover, since the amplification factor Gte and offset value Ote of TE signal corresponding to the intensity of laser beam are calculated and stored (step S26 or step S28), when the read power is changed, the amplification factor Gte and offset value Ote of the corresponding TE signal can be set easily.

In above explanation, the rotating velocity of optical disc 3 is determined, as an example, depending on the type or application content of optical disc 3. However, it is also possible to measure the rotating velocity (or transfer rate) of each part (internal circumference or external circumference) in the radius direction of the optical disc 3 in order to adjust the read power based on the result of measurement.

Moreover, in above explanation, the optical disc 3 is rotated in the standard velocity or 2-fold velocity. However, the present invention can also be applied when the disc 3 is rotated in the other velocity, for example, in the standard velocity or 2-fold velocity or 4-fold velocity.

A series of processes explained above may be executed with the hardware but also with the software. When a series of processes are executed with the software, a program forming such software may be installed to a computer comprised in the microcomputer 20 for control as the exclusive hardware or to a general purpose personal computer which can execute various functions through installation of various programs.

Next, with reference to FIGS. 8A–8C, a medium, which is used to set the computer as a general purpose personal computer by installing the program to execute a series of processes into the computer will then be explained below.

Figure 8A:
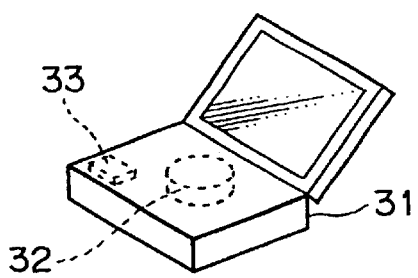
FIGS. 8A–8C is a diagram for explaining a medium.

As illustrated in FIG. 8A, the programs maybe offered to users in such a condition that these programs are previously installed to the hard disc 32 and semiconductor memory 33 as the recording medium comprised in the computer 31.

Figure 8B:
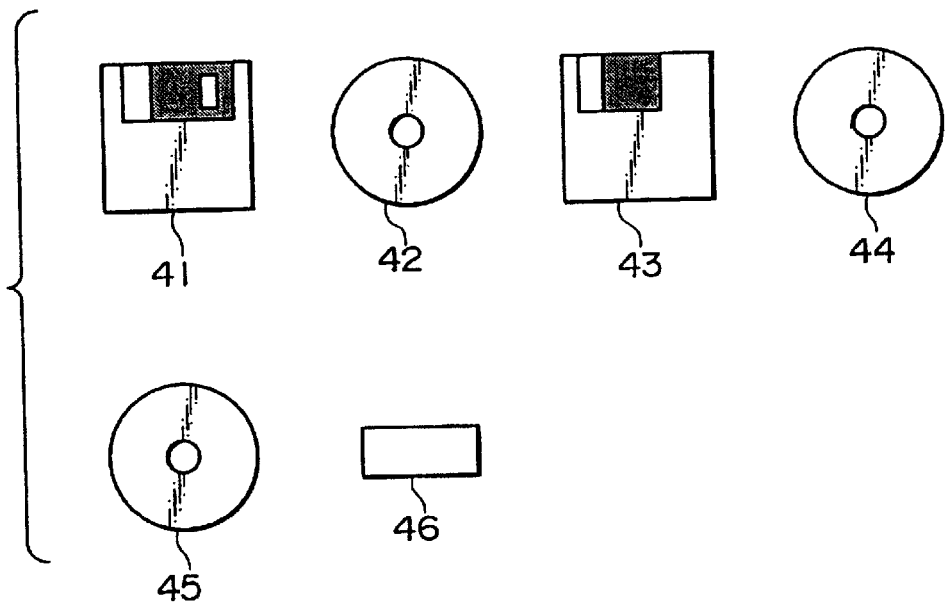

Or, the programs may be offered, as illustrated in FIG. 8B, as a package software in such a manner that these programs are temporarily or permanently stored to the recording medium such as floppy disk 41, CD-ROM 42, MO (Magneto-Optical) disc 43, DVD (Digital Versatile Disc) 44, magnetic disc 45 and semiconductor memory 46 or the like.

Figure 8C:
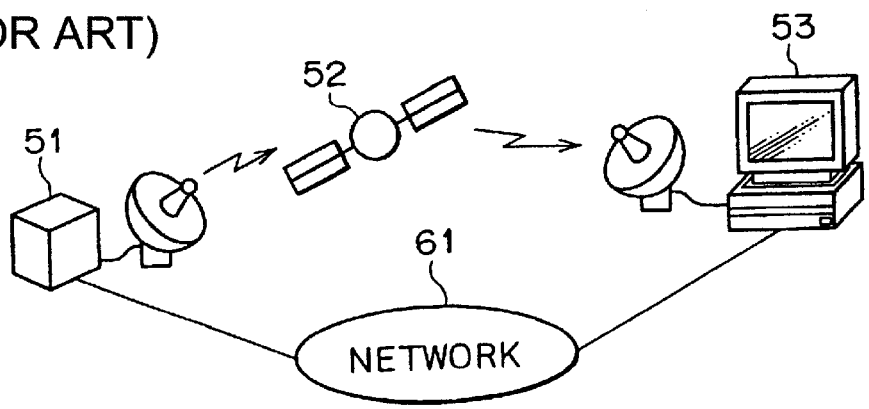

Moreover, as illustrated in FIG. 8C, the programs may be stored in the comprised hard disc in a personal computer 53 by transferring by radio the programs to a personal computer 53 from the down-load site 51 via an artificial satellite 52 for digital satellite broadcast or transferring by wire the programs to a personal computer 53 via the network 61 such as the local area network and Internet.

Moreover, in the present invention, the steps for describing the program provided with a medium naturally includes the processes which are performed on time series basis along the description sequence but also includes the processes which are not always executed on the time series basis but are executed in parallel or individually.

According to the optical reproducing apparatus, optical reproducing method and medium of the present invention, the rotating velocity of recording medium is detected, read power corresponding to the detected rotating velocity is determined and the recording medium is irradiated with the optical beam of the determined read power. Therefore, information can be read accurately.

Moreover, according to the optical recording apparatus, optical recording method and medium, the rotating velocity of recording medium is detected, read power corresponding to the detected rotating velocity is determined and the recording medium is irradiated with the optical beam in which the write power is added to the determined read power. Therefore, information can be recorded accurately.

What is claimed is:

1. An optical reproducing apparatus for reproducing information by radiating an optical beam of an optical read power to a recording medium, comprising:

storing means for calculating and storing a tracking amplification factor of a tracking error signal and a tracking offset value of said tracking error signal on the basis of the amplitude of said tracking error signal when a tracking control is performed; but the tracking control is never performed while the optical beam of said optical read power is being radiated;

setting means for calculating and setting a focus amplification factor of a focus error signal and a focus offset value of said focus error signal in inverse proportion to an amount of change of the optical read power when the optical beam of an optimum read power is being radiated to said recording medium;

detecting means for detecting a rotating velocity of said recording medium;

determining means for determining the optimum read power corresponding to said rotating velocity detected by said detecting means on the basis of the focus amplification factor, the focus offset value, the tracking amplification factor and the tracking offset value; and radiating means for radiating, to said recording medium, said optical beam of said optimum read power determined by said determining means.

2. An optical recording apparatus for recording information by radiating, to a recording medium, an optical beam in which a predetermined write power is added to an optimum read power, comprising:

detecting means for detecting the rotating velocity of said recording medium;

determining means for determining said optimum read power corresponding to said rotating velocity detected with said detecting means; and radiating means for radiating, to said recording medium, the optical beam in which said write power is added to said optimum read power determined by said determining means.

3. An optical recording apparatus as claimed in claim 2, wherein said detecting means for detecting the rotating velocity of said recording medium determines the rotating velocity based on the TOC information read from said recording medium.

4. A optical recording apparatus as claimed in claim 2, comprising:

storage means for calculating and storing an amplification factor and an offset value of a tracking error signal based on said tracking error signal when focus control is performed but the tracking control is never performed under the condition that said optical beam of said optimum read power is radiated; and setting means for calculating an amplification factor and an offset value of a focus error signal in inverse proportion to amount of change of read power when the optical beam of said optimum read power is radiated and for setting such values, to said radiating means, with said amplification factor and offset value of said tracking error signal stored in said storage means, whereby, said radiating means radiates, to said recording medium, the optical beam of said optimum read power determined in said determining means on the basis of said amplification factor and offset value of said focus error signal and said amplification factor and offset value of said tracking error signal set with said setting means.

5. An optical recording apparatus as claimed in claim 2, wherein said optimum read power is 25% or less of said write power.

6. An optical recording method of an optical recording apparatus for recording information by radiating, to a recording medium, an optical beam in which a predetermined write power is added to an optimum read power, comprising:

a detecting step of detecting the rotating velocity of said recording medium;

a determining step of determining said optimum read power corresponding to said rotating velocity detected with said detecting step; and a radiating step of radiating, to said recording medium, the optical beam in which said write power is added to said optimum read power determined in said determining step.

7. An optical recording method as claimed in claim 6, wherein the detecting step for detecting the rotating velocity of said recording medium determines the rotating velocity based on the TOC information read from said recording medium.

8. A medium which causes a computer to execute a program for realizing optical recording in an optical recording apparatus to record information by radiating, to a recording medium, an optical beam in which a predetermined write power is added to an optimum read power, comprising:

a detecting step of detecting the rotating velocity of said recording medium;

a determining step of determining said optimum read power corresponding to said rotating velocity detected with said detecting step; and a radiating step of radiating, to said recording medium, the optical beam in which said write power is added to said optimum read power determined in said determining step.

9. A medium as claimed in claim 8 which causes a computer to execute a program for realizing optical recording in the optical recording apparatus to record information by radiating, to said recording medium, the optical beam in which the predetermined write power is added to said optimum read power, wherein the detecting step for detecting the rotating velocity of said recording medium determines the rotating velocity on the basis of the TOC information read from said recording medium.

* * * * *